United States Patent
Dalbera et al.

[11] 3,822,926
[45] July 9, 1974

[54] METHOD TO CORRECT LACK OF EXTINCTION IN POLARIZING MICROSCOPE

[75] Inventors: Jean-Pierre Dalbera, Bagneux; Georges Nomarski, Bourg La Reine, both of France

[73] Assignee: Etablissement Public: Agence Nationale de Valorisation de la Recherches(ANVAR), Tour Aurore, Courbevoie, France

[22] Filed: Aug. 11, 1972

[21] Appl. No.: 279,749

[30] Foreign Application Priority Data
Aug. 19, 1971  France .............................. 71.30286

[52] U.S. Cl. .................................. 350/14, 350/15
[51] Int. Cl. ............................................ G02b 27/28
[58] Field of Search .............................. 350/14, 15

[56] References Cited
UNITED STATES PATENTS

| | | | |
|---|---|---|---|
| 2,414,709 | 1/1947 | Benford et al. | 350/15 |
| 2,936,673 | 5/1960 | Hyde et al. | 350/15 |
| 3,052,152 | 9/1962 | Koester | 350/15 X |

FOREIGN PATENTS OR APPLICATIONS

| | | | |
|---|---|---|---|
| 403,334 | 6/1966 | Switzerland | 350/15 |

Primary Examiner—David H. Rubin
Attorney, Agent, or Firm—Littlepage, Quaintance, Murphy & Dobyns

[57] ABSTRACT

The invention relates to a method for correcting the extinction faults of the polarizing microscope.

This method lies in decreasing the rotation of the polarization plane by coating at least one of the surfaces of the optical systems with at least one thin layer, having the most uniform geometrical depth allowed by the actual state of the art at least in the annular peripheral field of the surfaces included between 0.7 times and one times the useful diameter of the lenses. The index and the depth are calculated so as to compensate at least partially for the rotation of the polarization plane while limiting the phase displacement due to the anisotropy of transmission factors introduced by the thin layer(s) to a few degrees at the edge of the exit port. An anti-glare action of these layers is maintained by ensuring a reflection factor appreciably lower than that of bare glass.

17 Claims, 7 Drawing Figures

METHOD TO CORRECT LACK OF EXTINCTION IN POLARIZING MICROSCOPE

BACKGROUND OF THE INVENTION

The present invention refers to the correction of extinction faults of the polarizing microscope with a high numerical aperture.

It is known that the use of polarized light with a microscope greatly increases its field of application in some branches of science.

The polarizing microscope allows one to observe the anisotropic properties of objects by making them visible according to their anisotropy. A number of objects likely to be observed by means of a microscope have birefringent parts. By displaying these parts, it becomes possible to identify peculiarities which remain invisible with other methods of observation. By using the polarizing microscope, it thus becomes possible to detect a very wide range of double refractions in objects, the images of which will have to be as perfect as possible. Unfortunately, stray (or parasitic) light makes it difficult to detect weak double refractions in the current polarizing microscope.

Figure 1:
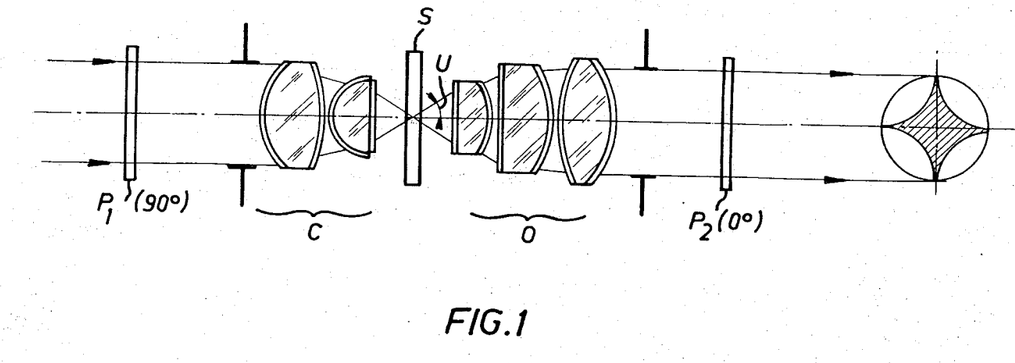
FIG. 1 illustrates the optical diagram of a polarizing microscope, as well as the appearance of its exit port when polarizers are crossed.

This stray (or parasitic) light, when polarizers ($P_1$ and $P_2$) are crossed is essentially due, to the distortion of the state of polarization induced by the microscope optical systems, that is, condenser C, object-slide S, and lens O (FIG. 1).

In polarizing microscopy with a high numerical aperture, the initial state of polarization cannot be maintained along a ray because of oblique incidences onto lenses. Particularly when polarizers are crossed, this distortion of the polarization state appears as a black cross in the exit port of the system. The light extinction is thus not complete and the microscope will be totally defined by an extinction factor C equal to the ratio of light flux in the exit port of the lens between crossed polarizers and parallel polarizers.

The whole lens surface, either bare or with a thin-layer coating, is characterized by two transmission factors of amplitude, $t_p \exp j\phi_p$ and $t_s \exp j\phi_s$, for polarizations parallel and perpendicular to the incidence plane, which are dependent on the orientation values of the ray passing through them. The phase difference due to the transmission anisotropy is $(\phi_p - \phi_s)t$. Should $(\phi_p - \phi_s)t$ be nil, the light, after having passed through the microscope, remains polarized in a rectilinear manner, and, in the exit port, the maximum angle of rotation $\alpha_m$ of the polarization plane can be approximately written as: $\alpha_m = (t_p - t_s)/2$ The transmission factors can be calculated by means of the Fresnel equations for bare surfaces, or by means of matrix methods (See: "Optical Properties of Thin Solid Films" by O. S. Heavens, Butterworths Scientific Publications, London, 1955, pages 69–73) in case of thin layer coating.

Various correcting systems have already been proposed for improving the extinction and thus increasing the sensitivity of the polarizing microscope.

According to a first system proposed by Foster and Benford, the particular properties of a thin layer of low index are used. A glass of index $n_s$ being coated with this layer allows one to equalize the transmission factors for a wavelength $\lambda$ and an angle of incidence $U_0$, should its index $n$ and its geometrical depth meet the following relations:

$$n = \sqrt{n_s} \cdot nd \cos U_1 = \lambda/4$$

with $\sin U_0 = n \sin U_1$

In order to avoid the influence of a lens on the state of polarization of a wave, this method consequently involves a variable geometrical depth of the layer on all surfaces, which has to be adjusted on each diopter, and an index of the vaporizable material equal to the square root of the index of each glass being used. Insuperable technical difficulties prevent the use of this method.

Inoue and Hyde have invented a corrector based on an entirely different principle. Their basic idea has been to construct a compensator, that is to provide a system producing a rotation $\alpha_m$ of the polarization plane, which would be exactly the reverse of that induced by the whole microscope. As the rotation $\alpha_m$ increases in direct relation to incidence, they have built an optical system of zero power, consisting of a high curvature air meniscus, and they have set a half-wave plate behind this latter element. The whole system, located before the condenser or behind the lens, allows one to correct the distortion of the state of polarization.

However, this compensator is to be located inside a port, and there is most often no access to it. Moreover, the system introduces a stray light which cannot be neglected.

Kornder and Weber have adopted the same principle of compensation by replacing the air meniscus by layers coating a surface (of the condenser or the objective) located in a place where angles of incidence are rather high. The main difficulty in this method is to find a place where the compensating plate can be located, as this plate is also very reflecting. This place is difficult to find in condensers and still more so in modern lenses.

Finally, Koester has improved the "Inoue and Hyde" method by the use of birefringent plates intended for compensation of the phase displacement $(\phi_p - \phi_s)$ induced by the antiglare coating of optical systems.

SUMMARY OF THE INVENTION

The present invention has for its object to act upon certain surfaces of an optical system in order, not only to eliminate the distortion of the polarization state involved by these surfaces, but also to almost completely compensate for the distortion induced by the rest of the optical system.

In this purpose, the invention provides a method for correction of extinction faults of a polarizing microscope consisting essentially of the optical systems of the condenser lens and the slide for the examined object and especially intended for examining birefringent objects or objects with a very low birefringence. The method is characterized in that it decreases the rotation of the polarization plane by coating, for example through vacuum sputtering or through a chemical process, at least one of the surfaces of said optical systems on which angles of incidence are the highest, with at least a thin layer of a geometrical thickness as uniform as is technically possible at least in the peripheral annular area of the surfaces included between 0.7 times and one times the useful diameter of the lenses, and with the index and the said depth being calculated in order to compensate at least partially for the rotation of the said polarization plane while limiting the phase difference due to the anisotropy of transmission factors introduced by the thin layer(s) to a few degrees at the edge of the exit port, and while maintaining an antiglare action of these layers by ensuring a reflection factor rather lower than that of bare glass.

Computations carried out on actual optical systems coated with such compensating thin layers have shown that, for a range of wave-lengths, the stray light due to the distortion of the polarization plane becomes low in comparison to that introduced by unavoidable but small faults of the polarizing microscope, such as residual strains of glass, poor extinction of polarizers, etc.

Such a method adds many advantages to those given hereabove, and among others are the following:

It can be matched to any optical system,

It corrects separately each system from the distortion of the polarization plane for a range of wavelengths, It does not impose an additional device which is to be adjusted.

It acts directly upon surfaces responsible for the distortion of the polarization plane, It allows optical systems to keep their anti-glare coating with a good efficiency, It allows one to select among existing vaporizable materials, It requires only a uniform depth of thin layers on the lenses, and It correctly corrects, for a wavelengths range, the phase difference due to the anisotropy of transmission, and thus avoids the use of a compensator of the birefringent plate type.

BRIEF DESCRIPTION OF THE DRAWINGS

Other features will become apparent from the following description of the present method, this description being given only as example, and in reference with the appended drawings, where:

FIG. 2b represents the variation diagram of the reflection factor R for the normal incidence ($U_o = 0°$) in terms of the wavelength $\lambda$ of the system of FIG. 2a and of the system V of the FIG. 1a;

DESCRIPTION OF THE PREFERRED EMBODIMENTS

The method of the invention utilizes dielectrical thin layers (such as those diagrammatically illustrated in an example on optical surfaces of the condenser C and of the lens O of FIG. 1) calculated for being used as compensators. Some thin-layer systems, having layers in the range of a few wavelengths, can induce a rotation $\alpha$ of the polarization plane in a direction opposite to the usual direction. Such layers, coating surfaces where angles of incidence are the highest, will eliminate not only the detrimental action of this particular surface, but also will compensate for other surfaces, technically more difficult to coat, due for example to their high degree of curvature. But the compensating properties of these thin layers are not sufficient. It is moreover necessary that these layers do not have not a too high a reflection factor for the normal incidence, and merely cause the phase difference to be as small as possible between the directions s and p, respectively perpendicular and parallel to the incidence plane. The systems implemented according to the invention should be actually optimized for meeting the three abovementioned conditions: be able to compensate, keep a certain antiglare action for the normal incidence (one single wavelength or wavelength range) and introduce only a very slight phase difference or displacement due to the anisotropy of the transmission.

The simplest case of a single layer laid on the optical surface will now be taken into consideration.

The above-mentioned conditions require the index of a single thin layer coating between two dielectrical media having indexes $n_o$ and $n_s$ to have a value which is generally too low to be obtained by the present state of technology. With respect to the angle of incidence $U_o$, the index $n_1$ and the geometrical depth $d_1$ of the layer should comply with the following conditions:

$$n_o \sin U_o / \sqrt{1 - \cos U_o \cos U_s} \leq n_1 \leq \sqrt{n_o n_s} \quad n_1 d_1 \cos U_1 = \lambda/4$$

$$R_\lambda (n_o, n_1, n_s, d_1) = \text{low}$$

with $n_o \sin U_o = n_1 \sin U_1 = n_s \sin U_s$
where R is the reflection factor for the normal incidence and $\lambda$ is the wavelength.

For $n_s = 1.52$ and $U_o = 40°$  $1.16 \leq n_1 \leq 1.23$

It has to be recalled that $U_o$ is the aperture angle corresponding to the folding point of the curve $(\phi_p - \phi_s)t = F$ (aperture) giving the smallest integral of the curve.

With optical glasses, $n_1$ it too low because the stable thin layer having the lowest index is that of the magnesium fluoride $MgF_2$ ($n_1 = 1.38$). Consequently, one cannot expect to construct compensators by using a single layer, but can only expect to decrease the extinction factor C of a system. For an anti-glare optical system with one single layer, it is however necessary to keep an optical depth $\lambda/4$ in oblique incidence for the layer, in order to cancel the transmission phase difference at the port edge. The contribution of the phase difference to the restauration of the stray light between crossed polarizers can be, in this case, decreased by a factor of 10, for the wavelength $\lambda$, the correction aperture being suitably selected (for example 0.9 times the maximum aperture).

The method of the invention is much more efficient when using two superimposed thin layers.

In such a case, a double infinity of depth-index pairs can cancel the phase difference or displacement due to the anisotropy of the transmission for a given angle of incidence and a given wavelength. Similarly, some combinations are preferred because their reflection factor has a slower variation for the normal incidence in terms of the wavelength. The compensation condi-.

tion is obtained for a rather broad range of indexes, together with the available ones. Several types of two-layer systems are thus possible. In the case where the conditions for rotation $\lambda$ of the polarization plane and phase difference or shifting are met for a wavelength $\lambda$, the various possibilities can also be distinguished by their stationary character. A theoretical approach to the simplest devices to be designed will now be described, without taking the material spreading into account. In the following computations, the thin layer in contact with the slide of index $n_s$ has an index $n_2$.

a. Optical thickness equal to $\lambda/4$

Assume two dielectrical layers of indexes and thickness $n_1$, $d_1$ and $n_2$, $d_2$ between two media of indexes $n_o$ and $n_s$. The phase shifting or difference between the parallel and perpendicular components (perpendicular to the incidence plane) is cancelled for the angle of incidence $U_o$ and the wavelength $\lambda$, provided the optical thicknesses meet the following relations:

$$n_1 \, d_1 \cos U_1 = n_2 \, d_2 \cos U_2 = \lambda/4$$

where $n_o \sin U_o = n_1 \sin U_1 = n_2 \sin U_2 = n_s \sin U_s$
From these optical thicknesses, the compensation condition is met when, for $n_1$ being set, the index $n_2$ complies with the inequality:

$$n_1 \sqrt{n_s/n_o} \leq n_2 \leq n_o \sin U_o \frac{\sqrt{\cos U_o/\cos U_o - \cos U_s}}{\cos^2 U_1}$$

Figure 1A:
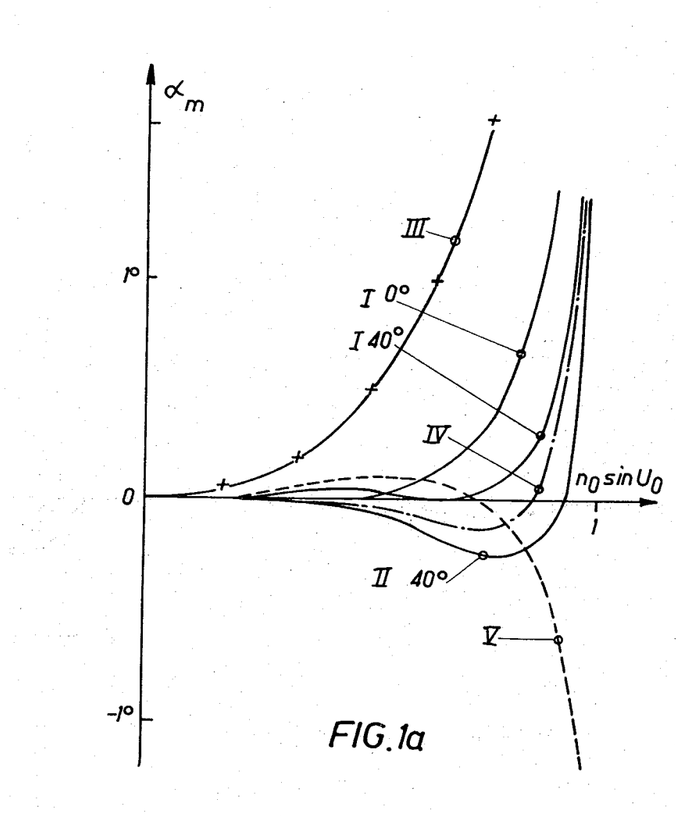
FIGS. 1a and 1b show respectively the diagrams of the variation of rotation $\phi_m$ of the polarization plane and of the variation of the phase difference displacement $(\phi_p - \phi_s)t$ in terms of the numerical aperture $n_o \sin U_o$ for several surfaces coated with two thin layers.
Figure 1B:
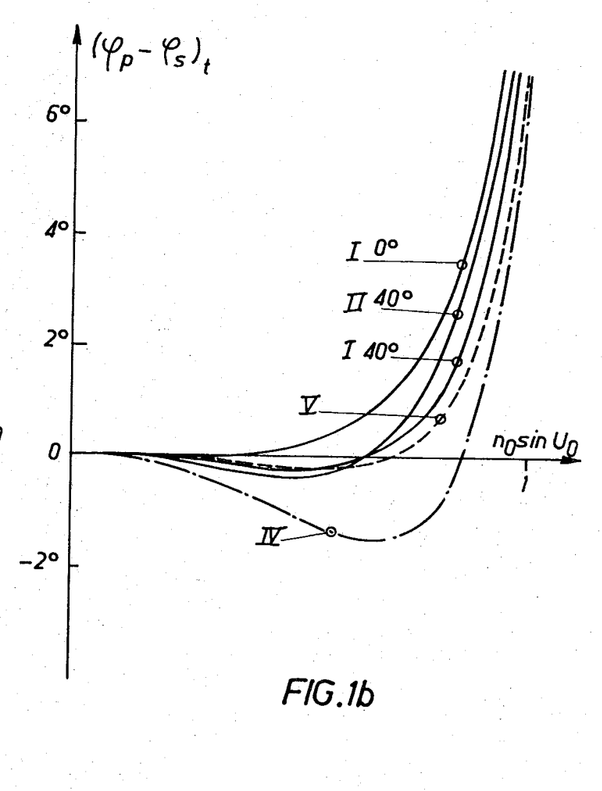

Under monochromatic light, the problem is solved if one can select an index $n_2$ actually existing and which does not excessively counteract the anti-glare properties. For example for $$n_o = 1 \; n_1 = 1.38 \; n_s = 1.52$$

there is $1.70 \leq n_2 \leq 2.36$
for $n_o = 1 \; n_1 = 1.38 \; n_s = 1.6$
there is $1.75 \leq n_2 \leq 2.54$ with $U_o = 40°$ With a substrate or support having an index 1.52 and with $n_2$ equal to 1.70, the intensity reflection factor $R$ for the normal incidence is 0.6%; with $n_2$ equal to 2.36, it becomes 11.6 percent. The intermediate choice of $n_2 = 1.9$ is convenient, as $R$ is equal to 2.2 percent. The FIGS. 1a and 1b show, for the wavelength $\lambda$ the variation of the rotation $\alpha_m$ of the polarization plane and of the phase shifting $(\phi_p - \phi_s)t$, in terms of the numerical aperture $n_o \sin U_o$ for different layer systems. The curves 1°–0° and 1°–40° relate to the systems of indexes 1.38–1.7 where optical thicknesses are $\lambda/4$ for angles of incidence 0° and 40°. The curves 11°–40° relate to the pair of optical thicknesses equal to $\lambda/4$ for the angle of 40° with indexes of 1.38 and 1.9. The index $n_s$ of the substrate or support is taken everywhere equal to 1.52. However, the index $n_s$ can have other values.

By way of comparison, the rotation curve $\alpha_m$ of the polarization plane in case of an uncoated glass surface ($n_s = 1.52$) has been illustrated in III on the FIG. 1a.

b. Cancelling of $R_s$

In a two-thin-layer system, there are two thickness pairs for which the reflection factor R, corresponding to the state of polarization $s$ or $p$, is nil for an angle of incidence $U_o$ and a wavelength $\lambda$. Should the factor $R_s$ be nil, for a given incidence, the rotation direction $\alpha$ of the polarization plane is then inverted as $R_p$ becomes higher than $R_s$. This property can be deduced from the equation giving $\alpha_m$. For carrying out this compensation condition, thicknesses $dj$ and indexes $nj$ should comply with the two following equations:

$$tg^2 \, \phi_2 = \bar{n}_2^2 \, (\bar{n}_s = \bar{n}_o)(\bar{n}_o \, \bar{n}_s - \bar{n}_1^2)/(\bar{n}_s\bar{n}_1^2 - \bar{n}_o n_2^2)(\bar{n}_2^2 - \bar{n}_s\bar{n}_o)$$

$$tg^2 \, \phi_1 = \bar{n}_1^2 \, (\bar{n}_s - \bar{n}_o)(\bar{n}_o\bar{n}_s - \bar{n}_2^2)/(\bar{n}_s\bar{n}_1^2 - \bar{n}_o\bar{n}_2^2)(\bar{n}_1^2 - \bar{n}_s\bar{n}_o)$$

where: $\bar{nj} = nj \cos Uj$ and $\Phi_j = 2\pi nj \, dj \cos Uj/\lambda$ and $j = 0,1,2,s$.

The indexes $n_1$ and $n_2$ being set up, as well as the angle of incidence for which $R_s$ is to be cancelled, the thicknesses $d_1$ and $d_2$ can be determined from the former relations. FIGS. 1a and 1b show the variation of the angle of rotation $\alpha_m$ of the polarization plane and of the phase shifting or difference $(\phi_p - \phi_s)t$ in terms of the numerical aperture, for the system (curve IV) the features of which are defined hereunder:

$n_o = 1$
$n_1 = 1.38 \; n_1 \, d_1 = 0.361\lambda \; R(0°) = 1 \%$
$n_2 = 2.35 \; n_2 \, d_2 = 0.066\lambda \; R_s(40°) = 0$
$n_s = 1.52$ Both possibilities described in the preceding paragraphs a) and b) solve the problem in monochromatic light. Another type of system which is in some cases more stationary when the wavelength varies is proposed herebelow.

c. Solution of the type $\lambda/4 - \lambda/2$

It is well-known that two thin layers, the thicknesses of which are $\lambda/4$ and $\lambda/2$ for the formal incidence, constitute anachromatic anti-glare system with two zeros of the reflection factor (for $\lambda_1$ and $\lambda_2$), should indexes $n_1$ and $n_2$ comply with the following equation:

$$n_s n_2 \, (n_1^2 + 1) \, (n_1 + n_2) - 2 \, n_1 \, (n_1 n_s^2 - n_2^3) = 0$$

with $2/\lambda_o = 1/\lambda_1 + 1/\lambda_2$
For example, $n_o = 1, n_1 = 1.38, n_2 = 1.94, n_s = 1.6$ If the index $n_2$ is selected higher than the value inducing the cancellation of $R$ for $\lambda_1$ and $\lambda_2$, about these wavelengths, compensating properties are observed in oblique incidence. However, the phase difference is not cancelled in the range of $\lambda_2$ when $\lambda_2$ is higher than $\lambda_1$. It is thus recommended that one select optical depths $\lambda/4$ and $\lambda/2$ for a large angle of incidence $U_o$. Very interesting properties of compensation (FIGS. 1a and 1b) are offered by the system (curves V) for which $U_o = 70°$ and $\lambda_2 = 550 \, nm$. While maintaining a reflection factor R rather low in the visible range (FIG. 2b), the characteristics of this system are defined hereunder:
$n_o = 1$
$n_1 = 1.38 \; n_1 d_1 = 147.5 \, nm$
$n_2 = 2.05 \; n_2 d_2 = 243,0 \, nm$
$n_s = 1.6$ This type of solution is quite suitable for practical cases in view of its stationary character, permissible values of indexes, and behaviour of the reflection factor for the normal incidence. The choice of the angle $U_o$, wavelengths $\lambda_o$ and $\lambda_2$, and indexes involve a number of possibilities for which the shape of R in terms of the wavelength remains practically the same.

The case of many-thin layer systems will be now considered.

With more than two layers, it is very difficult to approach the problem in a simple fashion, in view of the complex properties looked for.

It is however possible to determine such systems by using automatic calculation methods by means of computer program. The system is then to be described by a merit function which is the lowest when the whole thin layers meet the imposed requirements. For example, the $p_i$-weighted sum of the squares of differences between rotation $\bar{\alpha}$, phase difference $\bar{\phi}$ and the reflection factor $\bar{R}$ looked for, with the actually calculated values $\alpha_c, \phi_c R_c$.

$$\text{Function of merit} = p_1 \sum_{\sin U_o} (\alpha_c - \bar{\alpha})^2$$
$$+ p_2 \sum_{\sin U_o} (\varphi_c - \bar{\varphi})^2 + p_3 \sum_\lambda (R_c - \bar{R})^2$$

The success of such a study lies essentially in the choice of the function of merit which should integrally represent the three conditions described hereabove, and in the mathematical method of the research of the minimum. Such calculations allow one to reach in principle the optimum system by taking practical realities into account. The system of the curve VI (FIG. 2b) which is determined through this method, is a typical example, as it allows one to state that looking for an achromatic and compensating anti-glare treatment leads to shapes for variation of the reflection factor which are all practically similar and, moreover, identical with those of paragraph c).

Figure 2A:
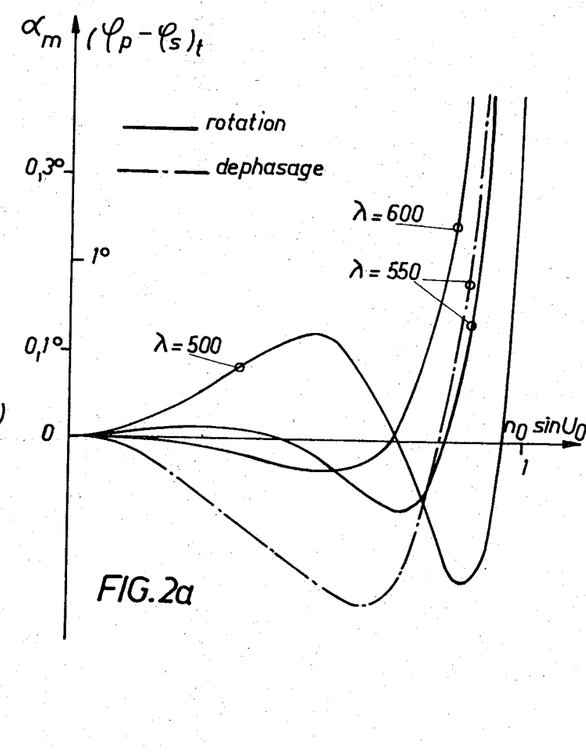
FIG. 2a illustrates the variation diagram of $\alpha_m$ and $(\phi_p - \phi_s)t$ in terms of the numerical aperture of a four-thin-layer system.
Figure 2B:
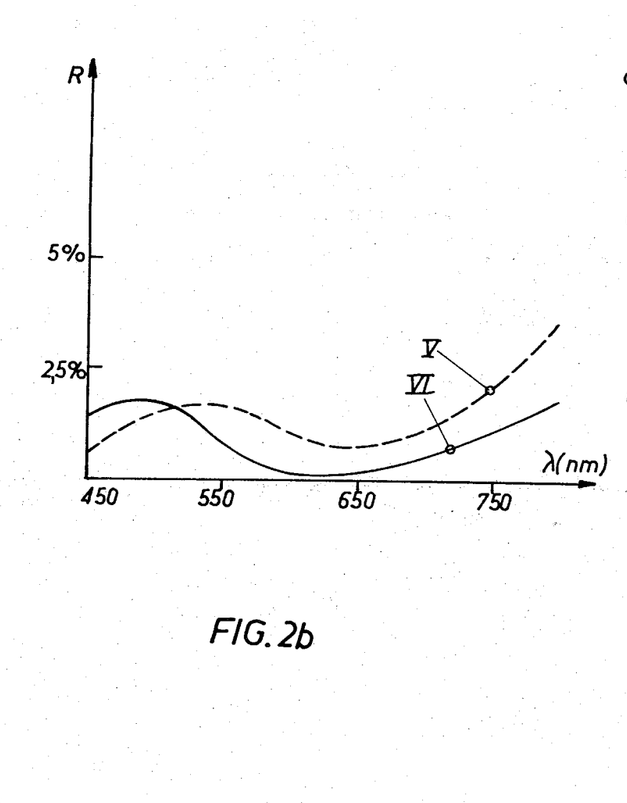

The system illustrated by the curve VI has the following characteristics:

$n_o = 1$         $n_s = 1.52$
$n_1 = 1.38$      $n_1 d_1 = 143$ nm
$n_2 = 2.05$      $n_2 d_2 = 274$ nm
$n_3 = 1.38$      $n_3 d_3 = 51$ nm
$n_4 = 2.05$      $n_4 d_4 = 45$ nm

Figure 3A:
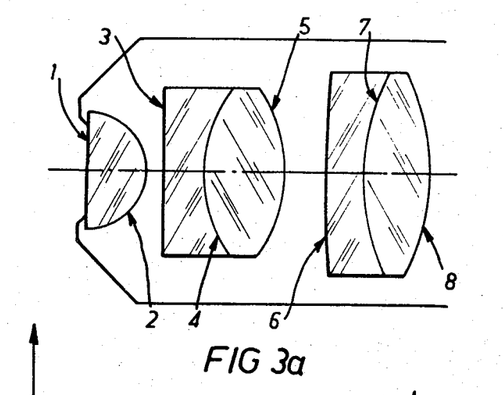
FIG. 3a is a diagrammatic illustration of an achromatic lens having been coated according to the invention.

As an example, a computer simulation has been carried out on the processing of thin-layers, of a conventional achromatic lens 60/0.85 for dry operation, the diagram of which is illustrated on the FIG. 3a. This uncoated lens (the formula of which is given below) has an extinction factor of $0.77 \cdot 10^{-3}$ and rotates the polarization plane by 4.8° at the edge of the exit port.

culated for each passing through a coated (processed) or uncoated (unprocessed) surface. By the above-mentioned formulas, it becomes easy to obtain the maximum angle of rotation of the polarizing plane as well as the phase difference $(\phi_p - \phi_s)t$ in the exit port.

The extinction factor C is then computed through numerical integration from the preceeding results.

In the first example (dashed lines), only surface number 1 is processed with the compensating system ($U_o = 50°$). The other surfaces (non-glued surfaces number 2,3,5,6,8) are anti-glare coated with a single layer of index 1.38 and of optical thickness $\lambda/4$ for the normal incidence. The improvement provided by the sole compensating layer is very important since, $\lambda$ being equal to 550 nm, the theoretical extinction factor is equal to $0.26 \times 10^{-4}$ and the maximum rotation of the polarization plane becomes equal to 0.35°.

In the second example (plain lines), surfaces number 1,2,3,6 are coated as before. Surfaces number 5 and 8 are now coated with the compensating system ($U_o = 0°$). The results obtained are summed up in Table 1 and it results therefrom that extinction is virtually perfect for a certain range of wavelengths.

It has to be noted that the phase difference curve $(\phi_p - \phi_s)t$ in terms of the numerical aperture should absolutely be folded back for the wavelength corresponding to the minimum curvature of the rotation $\alpha_m$. Otherwise, i.e., when this step is not taken, the influence of the phase difference becomes at least widely preponderant over the rotation influence and the extinction factor is thus increased.

This lens, provided with a correcting coating, should be associated in an actual polarizing microscope with a condenser also corrected according to the same method and preferrably working by immersion for eliminating the most important angles of incidence. A face of the object-slide can be coated if the lens works dry. Some physical factors can of course contribute to the increase of the overall theoretical extinction factor. The layers should be carefully realized in order to avoid appearance of their proper double refraction due to stresses generated at the sputtering time, and the layer thicknesses should in principle be uniform on the lens

| Diopters | 0 | 1 | 2 | 3 | 4 |
|---|---|---|---|---|---|
| Rays (mm) | | | | 1.3 | 3.208 |
| Thicknesses (mm) | 0.35 | 1.39 | 0.28 | 0.75 | |
| Indexes | | 1.516 | air | 1.648 | |
| Diopters | 5 | 6 | 7 | 8 | |
| Rays (mm) | − 3.4 | 35.409 | 4.956 | − 5.648 | |
| Thicknesses (mm) | 0.90 | 0.85 | 1.51 | | |
| Indexes | air | 1.648 | 1.510 | | |

Figure 3B:
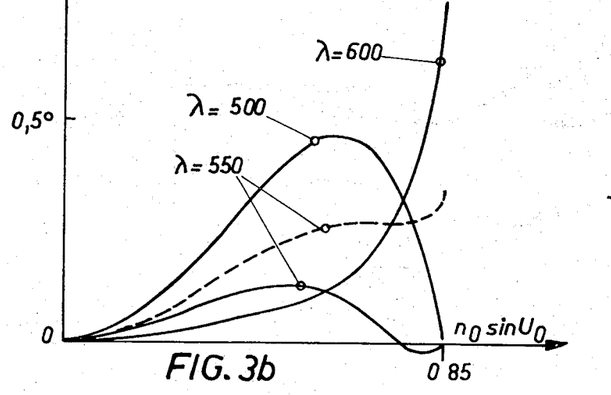
FIGS. 3b and 3c show the variation diagrams of respectively $\alpha_m$ and $(\phi_p - \phi_s)t$ in terms of the numerical aperture of the system of FIG. 3a and for different values of the wavelength.
Figure 3C:
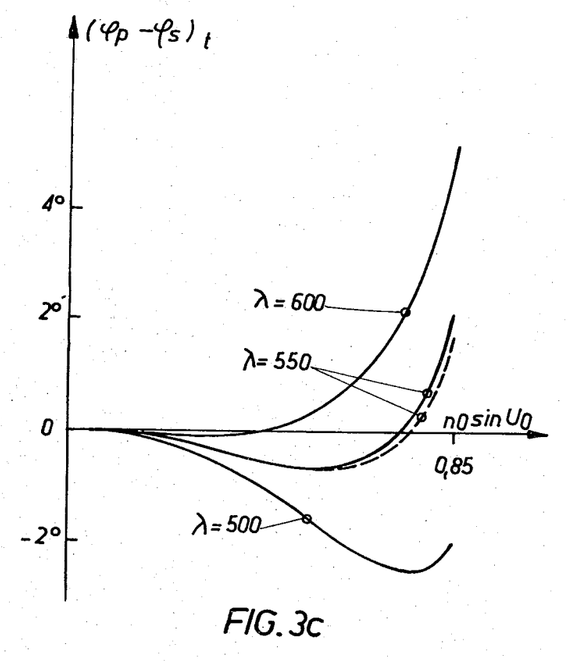

Two examples of distribution on thin layers on the lens surfaces are illustrated on FIGS. 3b and 3c by the curves drawn in plain and dotted lines. The compensating system used in this calculation as previously described need not specifically to be employed. The indexes of both curves are taken as equal to 1.38 and 1.9, the optical thicknesses being $\lambda/4$ for an angle of incidence $U_o$ defined below.

The overall computation requires an automatic passage of several meridian rays which divide the numerical aperture, for example 16; for each of them, the angle of incidence and the transmission factors are calsurfaces. The accuracy to be reached in optical thicknesses depends on the compensating coating used but it is important that this treatment be carried out with precision at least at the edge of the lenses. The polarizers should be selected for having an extinction factor lower than $10^{-5}$. Birefringences due to strains in the lenses should not be higher than $\lambda/1000$.

TABLE 1

| $\lambda$ (nm) | 500 | 550 | 600 |
|---|---|---|---|
| $\alpha_m$ | 0.46° | 0.13° | 0.78° |
| $(\phi_p - \phi_s)t$ | −2.44° | 2.19° | 5.27° |
| C | $0.14 \times 10^{-3}$ | $0.22 \times 10^{-4}$ | $0.16 \times 10^{-3}$ |

Consequently it is theoretically possible, in quasi-monochromatic light, to correct the extinction faults of the optical systems of the polarizing microscope because of high numerical aperture with practicably obtainable thin layers.

Extremely low values of the extinction factor have been obtained, this being an indication that the distortion of the polarization state can be thus reduced. In case of a polarizing microscope, very carefully manufactured and fitted with a lens and an immersion condenser of numerical aperture 0.85, one can reach an overall extinction factor of $10^{-5}$. By assuming a threshold of perceivable contrasts of 4 percent, the limit of sensitivity can be deduced from the equation $\pi 2 \Delta 2/\lambda^2 C = 0.04$ where $\Delta$ is the delay or lag due to the birefringence of the object. In previous microscopes, a lag of $\lambda/5000$ corresponding to 1 A can be detected at full lighting aperture.

We claim:

1. Method for correcting the extinction defects of a polarizing microscope including an optical system comprising a lens, a condenser and an object-slide, and especially intended for observing normally or very weakly birefringent objects, comprising the steps of
   A. decreasing the rotation of the polarization plane by substantially uniformly coating at least one optical surface within said optical system where angles of incidence are the most important with at least one thin layer at least in the peripheral annular area of the surfaces, included between 0.7 times and one time the useful diameter of the lenses,
   B. choosing the index and thickness of the at least one thin layer by calculation to compensate at least partially for the rotation of the said polarization plane while limiting to a few degrees at the edge of the exit port the phase shifting due to the anisotrophy of transmission factors introduced by the at least one thin layer and,
   C. maintaining an anti-glare action of these layers by ensuring a reflection factor appreciably lower than bare glass.

2. Method according to the claim 1, characterized by the fact that at least one of the surfaces of the said optical system is coated by a single layer having an index $n_1$ and a geometrical depth $d_1$ which comply for the incidence $U_o$ with the following conditions: $n_o \sin U_o / \sqrt{1 - \cos U_o \cos U_s} \leq n_1 \leq \sqrt{n_o n_s}$ $$n_1 d_1 \cos U_1 = \lambda/4$$

$R_\lambda$ $(n_o, n_1, n_s, d_1)$ = week with $n_o \sin U_o = n_1 \sin U_1 = n_s \sin u_s$, $R_\lambda$ being the reflection factor for the normal incidence and $\lambda$ being the wavelength.

3. Method according to the claim 1, characterized by the fact that at least one of the surfaces of said optical system is coated with a single layer of the lowest index possible having an optical thickness essentially equal to one-fourth of the wavelength for angles of incidence corresponding to the rays falling on the peripheral part of the lenses, for decreasing the phase difference due to the anisotropy of the transmission.

4. Method according to the claim 1, characterized by the fact that at least one of the surfaces of said optical system is coated with two layers of such indexes $n_1$, $n_2$ and of such geometrical depths $d_1$, $d_2$ that optical depths comply with the relations:

$n_1 d_1 \cos U_1 = n_2 d_2 \cos U_2 = \lambda/4$ and that, $n_1$ being set up, the index $n_2$ complies with the inequality: $n_1 \sqrt{n_s/n_o} \leq n_2 \leq n_o \sin U_o \dfrac{\sqrt{\cos U_o/\cos U_o - \cos U_s}}{\cos^2 U_1}$ 5. Method according to the claim 1, characterized by the fact that at least one of the surfaces of said optical system is coated with two layers with such indexes $n_1$ and $n_2$ and such geometrical thicknesses and $d_2$ that the reflection factor $R_s$ for the polarization perpendicular to the incidence plane be approximately nil for angles of incidence corresponding to the rays falling in the peripheral part of the lenses.

6. Method according to the claim 1, characterized by the fact that at least one of the surfaces of said optical system is coated with two thin layers, the characteristics being defined by starting from the concentional anti-glare coating having two thin layers with optical thicknesses of $\lambda_o/4$ and $\lambda_o/2$ for the normal incidence and with indexes $n_1$ and $n_2$ according to the known equation, selecting an index $n_2$ of higher value than that obtained from said known equation, and optical thickness equal to said values for oblique rays having an angle of incidence at least to 45°, the wavelength range where the compensation is carried out being shifted to the right towards the wavelengths higher than $\lambda_o$.

7. Method according to the claim 1, characterized by the fact that at least one of the surfaces of said optical system is coated with at least two layers the geometrical thicknesses and indexes of which are calculated from a function of merit of the following type:

$$\text{F. merit} = p_1 \sum_{\sin U_o} (\alpha_c - \bar{\alpha})^2 + p_2 \sum_{\sin U_o} (\varphi_c - \bar{\varphi})^2 + p_3 \sum_\lambda (R_c - \bar{R})^2$$

where $p_1$ is a ponderation factor, $\bar{\alpha}$, $\bar{\phi}$ and $\bar{R}$ being the respectively required values of the angle of rotation, the phase difference and the reflection factor and $\alpha_c$, $\phi_c$, and $R_c$ the calculated values of said variables, in order to obtain the minimum value of the said function of merit.

8. In an optical system for a polarizing microscope, the system including at least one optical element of index $n_s$ comprising at least one surface arranged such that, when light passes through the optical element and a media of index $n_o$ adjacent to the surface, certain rays of that light intersect said surface with a high angle of incidence,
   the improved means for correcting extinction defects at an exit port of the microscope caused by rotation of the polarization plane of light in the microscope comprising
   a plurality of superimposed thin layers of substantially uniform thickness at least in the peripherial annular area of at least said one surface, the indexes and the thicknesses of the respective thin layers being preselected
   A. to at least partially compensate for the rotation of the polarization plane
   B. to limit to a few degrees at the edge of the exit port the phase shifting due to anisotrophy of transmission factors introduced by the thin layers, and C. to maintain an anti-glare action of these thin layers by limiting the thin layers to a reflection factor appreciably lower than bare glass.

9. A system according to claim 8 for use with light of wavelength $\lambda$ wherein the plurality of superimposed thin layers comprises a first layer adjacent to said media and having a thickness $d_1$ and an index $n_1$ and a second layer adjacent to the first layers and to the surface and having a thickness $d_2$ and an index $n_2$, wherein the values of $d_1$, $n_1$, $d_2$, and $n_2$ are chosen to satisfy the simultaneous equations $n_1 d_1 \cos U_1 = n_2 d_2 \cos_2 U_2 = \lambda/4$
and
$n_0 \sin U_0 = n_1 \sin U_1 = n_2 \sin_2 U_2 = n_s \sin U_s$
and $$n_1 \sqrt{n_s/n_0} \leqslant n_s \leqslant \frac{n_0 \sin U_0 \sqrt{\cos U_0/\cos U_0 -}}{\cos U_2 \cos^2 U_1}$$

10. A system according to claim 8 wherein the plurality of superimposed thin layers comprise two layers having indexes $n_1$ and $n_2$ and thickness $d_1$ and $d_2$ chosen such that the reflection factor from the two superimposed layer is substantially zero.

11. A system according to claim 8 for use with light of wavelength $\lambda$ wherein the plurality of superimposed thin layers comprises a first layer adjacent to said media and having a thickness $d_1$ and an index $n_1$ and a second layer adjacent to the first layer and to the surface and having a thickness $d_2$ and an index $n_2$, wherein $n_1$ is between 1.34 and 1.40, $n_2$ is between 1.70 and 2.40 and both $d_1$ and $d_2$ equal $\lambda/4$.

12. A system according to claim 8 for use with light of wavelength $\lambda$ wherein the plurality of superimposed thin layers comprises a first layer adjacent to said media and having a thickness $d_1$ and an index $n_1$ and a second layer adjacent to the first layer and to the surface and having a thickness $d_2$ and an index $n_2$ wherein $1.34 < n_1 < 1.39$
$2.30 < n_2 < 2.40$
$0.33\lambda < n_1 d_1 < 0.40\lambda$, and
$0.05\lambda < n_2 d_2 < 0.1\lambda$ 13. A system according to claim 8 for use with light of wavelength $\lambda$ wherein the plurality of superimposed thin layers comprises a first layer adjacent to said media and having a thickness $d_1$ and an index $n_1$ and a second layer adjacent to the first layer and to the surface and having a thickness $d_2$ and an index $n_2$ wherein $1.34 < n_1 < 1.39$
$1.9 < n_2 < 2.2$
$130\text{nm} < n_1 d_1 < 150\text{nm}$
$205\text{nm} < n_2 d_2 < 250\text{nm}$ 14. A system according to claim 8 wherein the plurality of superimposed thin layers comprises more than two layers.

15. A system according to claim 14 wherein the more than two layers comprises a first layer of index $n_1$ and thickness $d_1$ next to the media, a second layer of index $n_2$ and thickness $d_2$, a third layer of index $n_3$ and thickness $d_3$ and a fourth layer of index $n_4$ and thickness $d_4$ next to the surface.

16. A system according to claim 15, wherein
$n_1 = 1.38$
$n_2 = 2.05$
$n_3 = 1.38$
$n_4 = 2.05$
$n_1 d_1 = 143\text{nm}$
$n_2 d_2 = 274\text{nm}$
$n_3 d_3 = 51\text{nm}$
$n_4 d_4 = 45\text{nm}$ 17. A method for correcting extinction defects in a polarizing microscope as made visible at an exit port of the microscope because of rotation of the polarization plane of light within the microscope, said microscope including an optical system which includes at least one optical element of index $n_s$ comprising at least one surface arranged such that, when light passes through the optical system into adjacent media of index $n_0$, certain rays of that light intersect said surface with a high angle of incidence, comprising the steps of:

A. choosing a first dielectric material having an index $n_1$ for application as a coating having a thickness $d_1$ and choosing a second dielectric material having an index $n_2$ for application as a coating having a thickness $d_2$ by calculating the index and thickness values which will compensate at least partially for the rotation of the polarization plane, which will limit phase shifting caused by anisotrophy of transmission factors introduced by such coatings to a few degrees at the edge of the exit port, and which will maintain an anti-glare action by having a reflection factor appreciably lower than bare glass, B. coating the second dielectric material directly on the surface, and C. coating the first dielectric material over the second dielectric material.

* * * * *